United States Patent
Zhang et al.

(10) Patent No.: US 9,451,496 B2
(45) Date of Patent: Sep. 20, 2016

(54) METHOD AND APPARATUS OF POSITIONING MOBILE TERMINAL BASED ON GEOMAGNETISM

(71) Applicant: Alibaba Group Holding Limited, Grand Cayman (KY)

(72) Inventors: Zhipeng Zhang, Hangzhou (CN); Liangjie Zhou, Hangzhou (CN); Xiao Qian, Hangzhou (CN); Hui Shen, Hangzhou (CN); Yunjiao Yao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 14/969,996

(22) Filed: Dec. 15, 2015

(65) Prior Publication Data
US 2016/0183116 A1    Jun. 23, 2016

(30) Foreign Application Priority Data
Dec. 18, 2014 (CN) .......................... 2014 1 0805561

(51) Int. Cl.
    *H04W 4/04*      (2009.01)
    *G01V 7/00*      (2006.01)
    *H04W 24/10*     (2009.01)
    *G01C 21/08*     (2006.01)

(52) U.S. Cl.
    CPC .............. *H04W 24/10* (2013.01); *G01C 21/08* (2013.01)

(58) Field of Classification Search
    None
    See application file for complete search history.

(56) References Cited

U.S. PATENT DOCUMENTS

| | | |
|---|---|---|
| 5,339,246 A | 8/1994 | Kao |
| 6,016,120 A | 1/2000 | McNabb et al. |
| 8,209,140 B2 | 6/2012 | Bailey |
| 8,711,517 B2 | 4/2014 | Erden et al. |
| 2003/0218546 A1 | 11/2003 | Lemp, III |
| 2004/0017192 A1 | 1/2004 | Clymer et al. |

(Continued)

OTHER PUBLICATIONS

PCT Search Report and Written Opinion mailed Mar. 8, 2016 for PCT Application No. PCT/US15/65848, 10 pages.

*Primary Examiner* — Quan M Hua
(74) *Attorney, Agent, or Firm* — Lee & Hayes, PLLC

(57) ABSTRACT

A method and an apparatus of positioning a mobile terminal based on geomagnetism. The mobile terminal has at least one magnetic force sensor. The method includes obtaining magnetic induction values of the mobile terminal at a plurality of predetermined measurement angles at a position to be measured via a magnetic force sensor; generating a geomagnetic fingerprint of the position to be measured, the geomagnetic fingerprint including the plurality of predetermined measurement angles and a respective magnetic induction value measured at each of the plurality of predetermined measurement angles; sending the geomagnetic fingerprint of the position to be measured to a fingerprint map matching system to determine geographical position information corresponding to the geomagnetic fingerprint; and receiving the geographical position information corresponding to the geomagnetic fingerprint returned from the fingerprint map matching system, and setting the received geographical position information as geographical position information of the position to be measured. The present disclosure is able to perform matching through magnetic induction values of multiple measurement angles at a same position in a positioning and matching process to increase the accuracy of positioning and reduce the cost of positioning.

18 Claims, 8 Drawing Sheets

(56) References Cited

U.S. PATENT DOCUMENTS

| | | | |
|---|---|---|---|
| 2007/0010956 A1* | 1/2007 | Nerguizian | G01C 21/206 702/57 |
| 2009/0009410 A1 | 1/2009 | Dolgin et al. | |
| 2012/0059846 A1 | 3/2012 | Sung et al. | |
| 2013/0179074 A1 | 7/2013 | Haverinen | |
| 2014/0018095 A1* | 1/2014 | Parvizi | H04W 4/043 455/456.1 |
| 2014/0032161 A1 | 1/2014 | Das et al. | |
| 2014/0171114 A1 | 6/2014 | Marti et al. | |
| 2014/0180627 A1 | 6/2014 | Naguib et al. | |
| 2014/0286534 A1 | 9/2014 | Haverinen | |
| 2014/0320121 A1* | 10/2014 | Perttunen | G01C 21/08 324/244 |

\* cited by examiner

METHOD AND APPARATUS OF POSITIONING MOBILE TERMINAL BASED ON GEOMAGNETISM

CROSS REFERENCE TO RELATED PATENT APPLICATION

This application claims foreign priority to Chinese Patent Application No. 201410805561.9 filed on Dec. 18, 2014, entitled "Method and Apparatus of Positioning Mobile Terminal Based on Geomagnetism", which is hereby incorporated by reference in its entirety.

TECHNICAL FIELD

The present disclosure relates to the field of communications, and particularly, to technologies of positioning a mobile terminal based on geomagnetism.

BACKGROUND

The rapid development and popularization of mobile terminals such as mobile phones and handheld computers have brought about the emergence and rapid development of indoor (or local region) positioning technology, which mainly integrates a number of technologies, such as wireless communication, base station positioning and inertial navigation positioning, etc., to form an indoor position positioning system for monitoring the positions of people, objects and the like in an indoor space. This positioning technology has a widespread need and application in a variety of fields, e.g., commercial applications, public security and military scenarios.

Currently, mainstream indoor positioning technology primarily relies on a wireless beacon (e.g., Bluetooth, WiFi, etc.) or a scenario image to carry out a feature matching to determine an initial position or a reference position, and perform adjustments of positioning points with the help of gait navigation, inertial navigation, etc. This type of mainstream indoor positioning technology, however, has problems of high overhead for device deployment, high power consumption of mobile devices (wireless beacon mode), and complicated and inaccurate positioning algorithm (scenario image mode). For positioning technology using a scenario image, scenario images of locations are captured, and image features and location information are recorded during collection to establish a feature-position database. Moreover, during the positioning, an image of a current location is captured, and features thereof are extracted and compared with features in the feature database to determine a current position.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure.

An aspect of the present disclosure is to provide a method and an apparatus of positioning a mobile terminal based on geomagnetism, which matches magnetic induction values in a same position from multiple measurement angles during positioning and matching to increase the accuracy of positioning and reduce the cost of positioning.

In order solve the foregoing technical problems, embodiments of the present disclosure provide a method of positioning a mobile terminal based on geomagnetism. The mobile terminal includes at least one magnetic force sensor. In an implementation, the method may include obtaining respective magnetic induction values of the mobile terminal from at least two predetermined measurement angles at a position to be measured using the magnetic force sensor; generating a geomagnetic fingerprint of the position to be measured, the geomagnetic fingerprint including the at least two predetermined measurement angles and the respective magnetic induction values measured at the predetermined measurement angles; sending the geomagnetic fingerprint of the position to be measured to a fingerprint map matching system to cause a determination of geographical position information corresponding to the geomagnetic fingerprint; and receiving the geographical position information corresponding to the geomagnetic fingerprint returned from the fingerprint map matching system, and determining the received geographical position information as geographical position information of the position to be measured.

The embodiments of the present disclosure further provide a method of positioning a mobile terminal based on geomagnetism, which may include receiving a geomagnetic fingerprint of a position to be measured from a mobile terminal, the geomagnetic fingerprint including at least two predetermined measurement angles and corresponding magnetic induction values measured by a magnetic force sensor of the mobile terminal from the predetermined measurement angles; performing a matching between the received geomagnetic fingerprint and geomagnetic fingerprints previously stored in a fingerprint map via respective magnetic induction values obtained from a same measurement angle, and determining geographical position information corresponding to the geomagnetic fingerprint of the position to be measured in accordance with a matching result; and returning the geographical position information corresponding to the geomagnetic fingerprint of the position to be measured to the mobile terminal.

The embodiments of the present disclosure further provide a method of positioning a mobile terminal based on geomagnetism. The mobile terminal includes at least one magnetic force sensor. In an implementation, the method may include obtaining corresponding magnetic induction values of the mobile terminal at a position to be measured from at least two predetermined measurement angles using the magnetic force sensor, to obtain a geomagnetic fingerprint of the position to be measured; and performing a matching between the received geomagnetic fingerprint and geomagnetic fingerprints previously stored in a fingerprint map via respective magnetic induction values obtained from a same measurement angle, and determining geographical position information corresponding to the geomagnetic fingerprint of the position to be measured in accordance with a matching result, wherein each geomagnetic fingerprint of the geomagnetic fingerprints includes the at least two predetermined measurement angles and a magnetic induction value measured at each predetermined measurement angle, and the fingerprint map includes at least two pieces of geographical position information and a geomagnetic fingerprint corresponding to each piece of geographical position information.

The embodiments of the present disclosure further provide an apparatus of positioning a mobile terminal based on geomagnetism. The mobile terminal includes at least one magnetic force sensor. In an implementation, the positioning apparatus may include a first acquisition unit configured to obtain respective magnetic induction values of the mobile terminal from at least two predetermined measurement angles at a position to be measured using the magnetic force sensor; a generation unit configured to generate a geomagnetic fingerprint of the position to be measured, the geomagnetic fingerprint including the at least two predetermined measurement angles and the respective magnetic induction values measured at the predetermined measurement angles; a first sending unit configured to send the geomagnetic fingerprint of the position to be measured to a fingerprint map matching system to cause a determination of geographical position information corresponding to the geomagnetic fingerprint; and a first receiving unit configured to receive the geographical position information corresponding to the geomagnetic fingerprint returned from the fingerprint map matching system, and determine the received geographical position information as geographical position information of the position to be measured.

The embodiments of the present disclosure further provide an apparatus of positioning a mobile terminal based on geomagnetism, which may include a second receiving unit configured to receive a geomagnetic fingerprint of a position to be measured from a mobile terminal, the geomagnetic fingerprint including at least two predetermined measurement angles and corresponding magnetic induction values measured at the predetermined measurement angles via a magnetic force sensor of the mobile terminal; a first matching unit configured to perform a matching between the received geomagnetic fingerprint and geomagnetic fingerprints previously stored in a fingerprint map via respective magnetic induction values obtained from a same measurement angle, and determine geographical position information corresponding to the geomagnetic fingerprint of the position to be measured in accordance with a matching result; and a second sending unit configured to return the geographical position information corresponding to the geomagnetic fingerprint of the position to be measured to the mobile terminal.

The embodiments of the present disclosure further provide an apparatus of positioning a mobile terminal based on geomagnetism. The mobile terminal includes at least one magnetic force sensor. In an implementation the positioning apparatus may include a second acquisition unit configured to obtain corresponding magnetic induction values of the mobile terminal at a position to be measured from at least two predetermined measurement angles using the magnetic force sensor, to obtain a geomagnetic fingerprint of the position to be measured; and a second matching unit configured to perform a matching between the received geomagnetic fingerprint and geomagnetic fingerprints previously stored in a fingerprint map via respective magnetic induction values obtained from a same measurement angle, and determine geographical position information corresponding to the geomagnetic fingerprint of the position to be measured in accordance with a matching result, wherein each geomagnetic fingerprint of the geomagnetic fingerprints includes the at least two predetermined measurement angles and a magnetic induction value measured at each predetermined measurement angle, and the fingerprint map includes at least two pieces of geographical position information and a geomagnetic fingerprint corresponding to each piece of geographical position information.

Compared with existing technologies, the embodiments of the present disclosure have the following advantages and effects.

Since each geomagnetic fingerprint includes at least two sets of measurement angles and corresponding magnetic induction values, matching magnetic induction values of multiple measurement angles in a same position during positioning and matching is plausible, thus increasing an accuracy of positioning of a mobile terminal. Furthermore, collecting magnetic induction data of multiple measurement angles is convenient and efficient, which can be achieved in existing mobile terminals and thus has a low cost of positioning. In addition, an indoor positioning that is based on a geomagnetic field does not need other positioning reference devices and no special requirement for positioning scenarios is needed, thus reducing the cost of positioning.

Since each geomagnetic fingerprint includes at least two sets of measurement angles and corresponding magnetic induction values, matching magnetic induction values of multiple measurement angles in a same position during positioning and matching is plausible, thus increasing an accuracy of positioning. Moreover, an indoor positioning that is based on a geomagnetic field does not need other positioning reference devices and no special requirement for positioning scenarios is needed, thus reducing the cost of positioning.

Furthermore, multiple magnetic force sensors correspond to different measurement angles. A mobile terminal with multiple magnetic force sensors is able to obtain magnetic induction values at multiple measurement angles during positioning at a certain time point or at a same position simultaneously, and does not like a mobile terminal with only one magnetic force sensor that needs to perform measurements from multiple measurement angles, thus further increasing the efficiency of obtaining magnetic induction data and making positioning simple and convenient.

Furthermore, mobile terminals, such as mobile phones and tablet computers, etc., generally have at least one magnetic force sensor. Thus, by prompting a user to rotate a mobile terminal in a suitable rotation manner, desirable measurement values for positioning can be obtained to complete the positioning, which is convenient and time-saving.

Moreover, for a positioning region having multiple levels, an air pressure sensor may be used to assist in positioning, which can increase an accuracy of positioning the levels and needs a less amount of computation.

DETAILED DESCRIPTION

A number of technical details are illustrated hereinafter to facilitate understanding of the present disclosure by readers. However, one of ordinary skill in the art should understand that technical solution(s) sought to be protected in the appended claims of the present disclosure can be implemented even without these technical details, and various variations and modifications made to embodiments described herein.

In order to make the objectives, technical solutions, and advantages of the embodiments of the present disclosure more comprehensible, the embodiments of the present disclosure are described in further detail with reference to the accompanying drawings.

Figure 1:
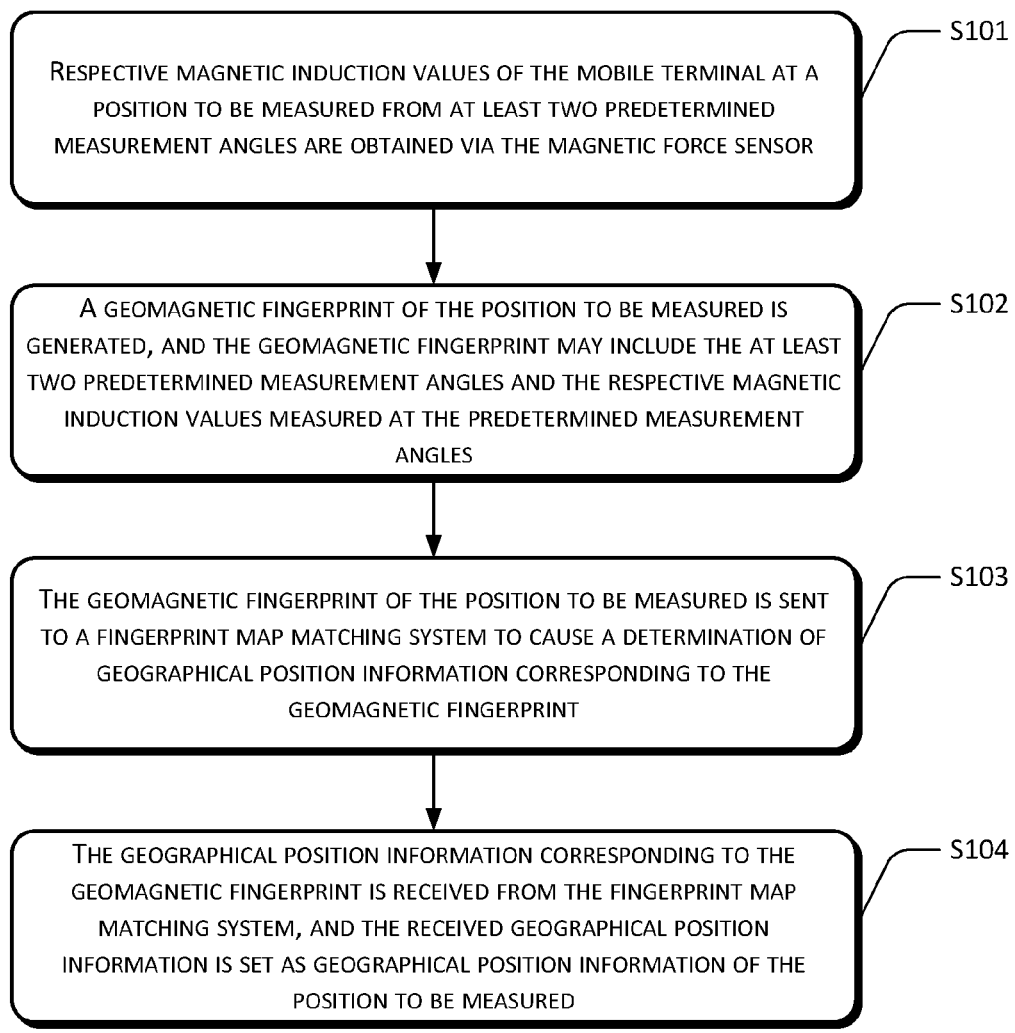
FIG. 1 is a flowchart of a method of positioning a mobile terminal based on geomagnetism according to a first embodiment of the present disclosure.

A first embodiment of the present disclosure relates to a method of positioning a mobile terminal based on geomagnetism. FIG. 1 shows a flowchart of a method of positioning a mobile terminal based on geomagnetism.

In an implementation, the mobile terminal may include at least one magnetic force sensor. As shown in FIG. 1, the method of positioning a mobile terminal based on geomagnetism may include the following method blocks.

At S101, respective magnetic induction values of the mobile terminal at a position to be measured from at least two predetermined measurement angles are obtained via the magnetic force sensor. A measurement angle corresponds to an included angle between a device line of the magnetic force sensor and a direction of gravitational acceleration.

The device line may either be a straight line that indicates a direction of an associated device per se, or a predefined straight line that is fixed with respect to a specified physical structure of the device. The device line may correspond to a solid line or a virtual line of a physical structure of the device, for example, an axis of the magnetic force sensor, a certain straight line that is prefabricated to pass through the center of the magnetic force sensor or a straight line that is perpendicular to the axis of the magnetic force sensor, etc. In addition, in various implementations of the present disclosure, the direction of gravitational acceleration may be obtained via an acceleration sensor, a gyroscope, etc., of the mobile terminal.

At S102, a geomagnetic fingerprint of the position to be measured is generated, and the geomagnetic fingerprint may include the at least two predetermined measurement angles and the respective magnetic induction values measured at the predetermined measurement angles.

At S103, the geomagnetic fingerprint of the position to be measured is sent to a fingerprint map matching system to cause a determination of geographical position information corresponding to the geomagnetic fingerprint.

In an implementation of the present disclosure, a predetermined measurement angle and a magnetic induction value measured at that predetermined measurement angle form a magnetic induction measurement value pair. Therefore, the fingerprint map matching system performs a matching of all magnetic induction measurement value pairs in the geomagnetic fingerprint of the position to be measured with a magnetic induction measurement value of each geomagnetic fingerprint in a fingerprint map, with a many-to-many matching between two geomagnetic fingerprints.

In addition, it can be understood that the fingerprint map matching system is located on the mobile terminal side in this implementation. In implementations of the present disclosure, the fingerprint map matching system may alternatively be located at a server side.

At S104, the geographical position information corresponding to the geomagnetic fingerprint is received from the fingerprint map matching system, and the received geographical position information is set as geographical position information of the position to be measured.

Figure 2:
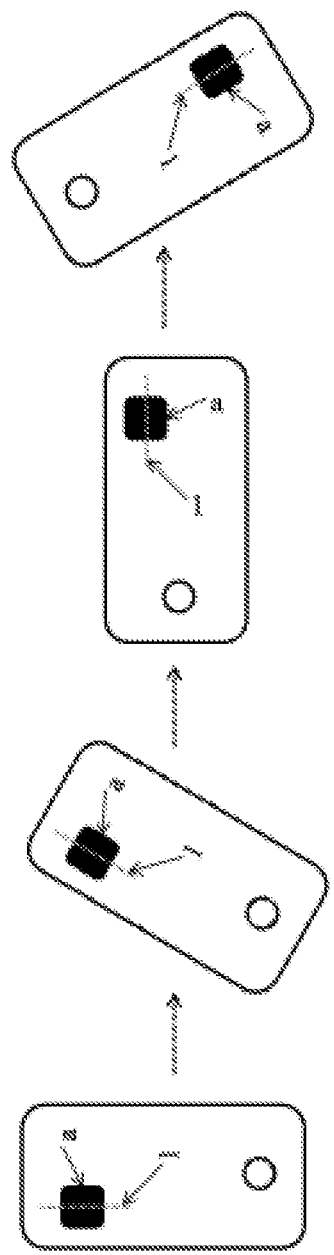
FIG. 2 is a schematic diagram of obtaining magnetic induction values at different measurement angles by a mobile terminal having a magnetic force sensor according to the first embodiment of the present disclosure.

Generally, mobile terminals, such as mobile phones and tablet computers, have at least one magnetic force sensor. Therefore, by prompting a user to rotate a mobile terminal in a suitable rotation manner, desirable measurement values for positioning may be obtained to complete the positioning, which is convenient and time-saving. For example, in an exemplary implementation of the present disclosure, the mobile terminal may include a display screen and a magnetic force sensor, and S101 may include the following sub-blocks:

sending a prompt message of rotating the mobile terminal and causing the prompt message to display on the display screen of the mobile terminal. In an example, the prompt message may be displayed on a plane of a mobile phone or a tablet computer, prompting the user to rotate the mobile phone or the tablet computer in a clockwise or counterclockwise direction on a plane perpendicular to the ground. FIG. 2 shows a schematic diagram of rotating a mobile terminal in a clockwise direction. The label 1 in the figure indicates the device line of the magnetic force sensor, and the label a indicates the magnetic force sensor.

Measurement angles are monitored during a process of rotation of the mobile terminal, and the respective magnetic induction values measured by the magnetic force sensor from the at least two predetermined measurement angles are obtained.

In addition, it can be understood that a voice prompt may be used to instruct the user to perform a rotating operation on the mobile terminal in other implementations of the present disclosure. In that case, a positioning operation may be performed regardless of whether the mobile terminal has a display screen.

Figure 3:
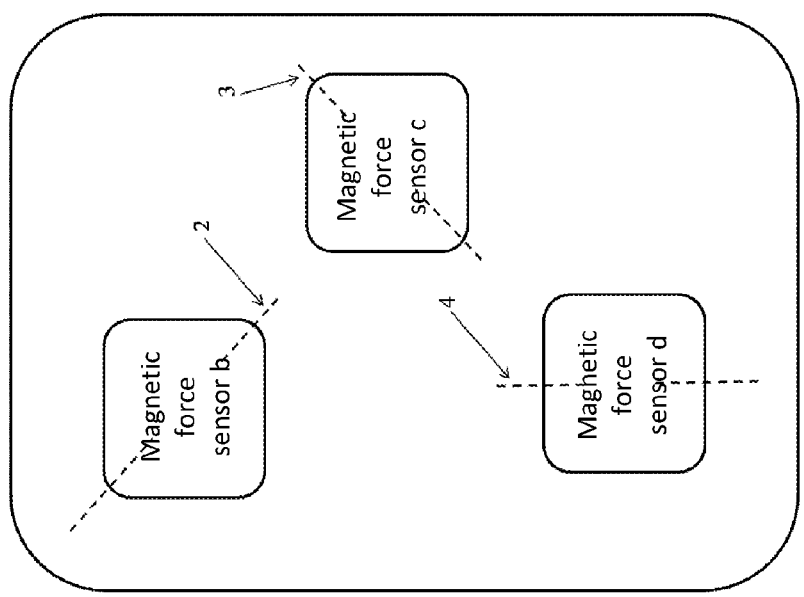
FIG. 3 is a schematic diagram of acquiring magnetic induction values by a mobile terminal having three magnetic force sensors according to the first embodiment of the present disclosure.

Furthermore, for a mobile terminal having multiple magnetic force sensors, these multiple magnetic force sensors correspond to different measurement angles. A mobile terminal having multiple magnetic force sensors is able to obtain magnetic induction values at multiple measurement angles during positioning at a certain time point or at a same position simultaneously, and does not like a mobile terminal with only one magnetic force sensor that needs to perform measurements from multiple measurement angles, thus further increasing the efficiency of obtaining magnetic induction data and making positioning simple and convenient. For example, in another exemplary implementation of the present disclosure, the mobile terminal may possess at least two magnetic force sensors, and device lines of different magnetic force sensors have different included angles with the direction of gravitational acceleration at a same time point. FIG. 3 shows a mobile terminal having three magnetic force sensors b, c and d, and straight lines 2, 3 and 4 are device lines of the magnetic force sensors b, c and d respectively in the figure.

For a multi-floor positioning area, an air pressure sensor may be adopted to assist in positioning, which can increase the accuracy of positioning the floors and need a less computation amount. For example, in an exemplary implementation of the present disclosure, the mobile terminal may include an air pressure sensor. At S101, an air pressure value of the mobile terminal at the position to be measured is measured via the air pressure sensor, and the geomagnetic fingerprint further includes the measured air pressure value. At S103, the fingerprint map matching system may obtain the air pressure value in the geomagnetic fingerprint, and compare the air pressure value with an air pressure value in the geomagnetic fingerprint in the previous matching. If a difference therebetween does not exceed a certain threshold, this indicates that the position to be measured is still on a floor that is the same as before. Therefore, a comparison of the geomagnetic fingerprint of the position to be measured may be made only to geomagnetic fingerprints belonging to the same floor as the geographical position information that was determined previously, to reduce an amount of computation. If the difference exceeds a certain threshold, this indicates that the floor of the position to be measured changes. Thus, a matching or comparison between the geomagnetic fingerprint of the position to be measured and all geomagnetic fingerprints in the fingerprint map matching system that belong to the positioning area is needed to be performed.

Since each geomagnetic fingerprint includes at least two sets of measurement angles and corresponding magnetic induction values, a matching of magnetic induction values at multiple measurement angles in a same position may be performed during positioning and matching to increase an accuracy of positioning the mobile terminal. Furthermore, magnetic induction data of multiple measurement angles is conveniently and easily collected, which is implementable in existing mobile terminals and thus has a low cost of positioning. In addition, an indoor positioning that is based on a geomagnetic field does not need other positioning reference devices, and no special requirements for positioning scenarios are needed, thus reducing the cost of positioning.

Figure 4:
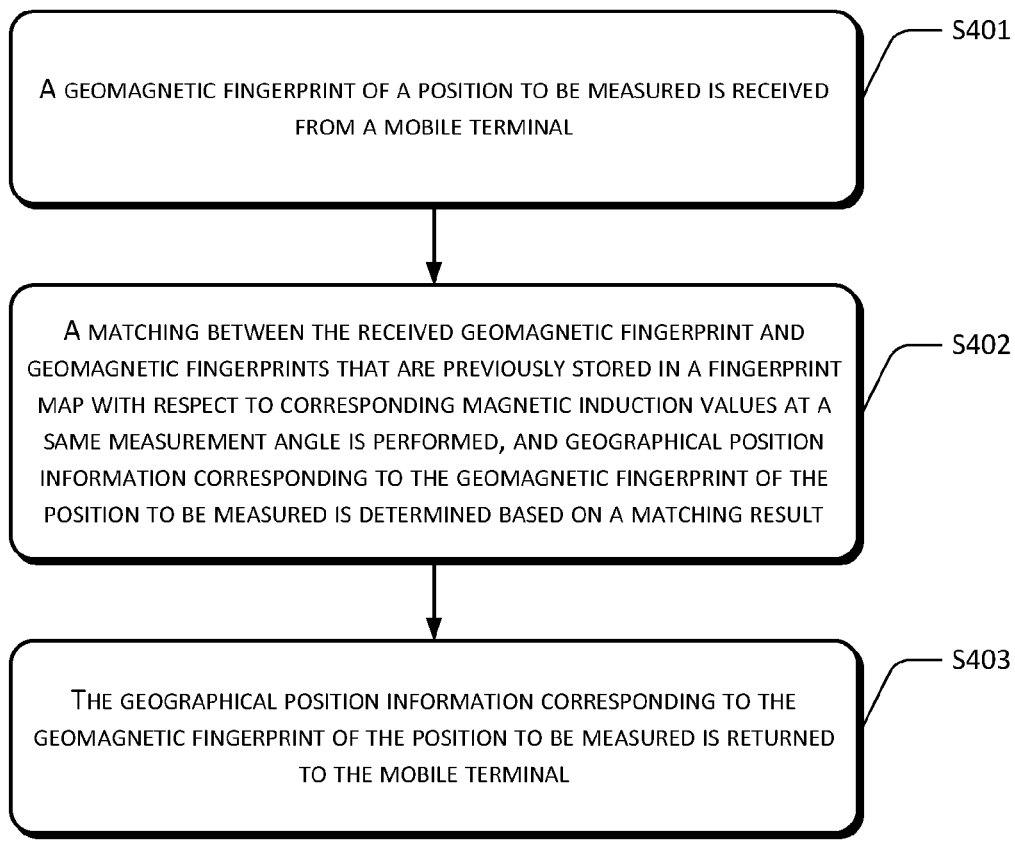
FIG. 4 is a flowchart of a method of positioning a mobile terminal based on geomagnetism according to a second embodiment of the present disclosure.

A second embodiment of the present disclosure is related to a method of positioning a mobile terminal based on geomagnetism. FIG. 4 shows a schematic flowchart of a method of positioning a mobile terminal based on geomagnetism.

As shown in FIG. 4, in an implementation, the positioning method of a mobile terminal based on geomagnetism may include the following method blocks.

At S401, a geomagnetic fingerprint of a position to be measured is received from a mobile terminal, the geomagnetic fingerprint including at least two predetermined measurement angles and respective magnetic induction values measured by a magnetic force sensor in the mobile terminal at the predetermined measurement angles. A measurement angle refers to an included angle between a device line of a magnetic force sensor and a direction of gravitational acceleration.

The mobile terminal may send a geomagnetic fingerprint that is collected to a server in real time. For example, in an exemplary implementation of the present disclosure, by adopting the method described in the first embodiment, a mobile terminal having one or more magnetic force sensors may collect magnetic induction values at multiple measurement angles in response to a screen prompt or a voice prompt to form a geomagnetic fingerprint which is sent to a server.

The device line may either be a straight line that indicates a direction of an associated device per se, or a predefined straight line that is fixed with respect to a specified physical structure of the device. The device line may correspond to a solid line or a virtual line of a physical structure of the device, for example, an axis of the magnetic force sensor, a certain straight line that is prefabricated to pass through the center of the magnetic force sensor or a straight line that is perpendicular to the axis of the magnetic force sensor, etc. In addition, in various implementations of the present disclosure, the direction of gravitational acceleration may be obtained via an acceleration sensor, a gyroscope, etc., of the mobile terminal.

At S402, a matching between the received geomagnetic fingerprint and geomagnetic fingerprints that are previously stored in a fingerprint map with respect to corresponding magnetic induction values at a same measurement angle is performed, and geographical position information corresponding to the geomagnetic fingerprint of the position to be measured is determined based on a matching result.

In an implementation of the present disclosure, a predetermined measurement angle and a magnetic induction value measured at that predetermined measurement angle form a magnetic induction measurement value pair. Therefore, a matching between all magnetic induction measurement value pairs in the geomagnetic fingerprint of the position to be measured and a magnetic induction measurement value of each geomagnetic fingerprint in a fingerprint map is performed at S402, with a many-to-many matching between two geomagnetic fingerprints.

At S403, the geographical position information corresponding to the geomagnetic fingerprint of the position to be measured is returned to the mobile terminal. The mobile terminal receives the geographical position information, and may determine a location that is positioned.

In the present disclosure, S402 may be implemented in a number of different ways. For example, geographical position information of a geomagnetic fingerprint which has the highest degree of matching with the received geomagnetic fingerprint in the fingerprint map is sent to the mobile terminal as the geographical position information of the position to be measured. Additionally or alternatively, geographical position information of geomagnetic fingerprint(s) which degree(s) of matching with the geomagnetic fingerprint of the position to be measured is/are higher than a certain threshold in the fingerprint map is/are selected. An average position or an average position weighted by the matching degree(s) is computed for the geographical position information corresponding to the geomagnetic fingerprints, and a result thereof is sent to the mobile terminal.

For a multi-floor positioning area, an air pressure sensor may be employed to assist in positioning, which is able to increase an accuracy of positioning a floor and requires less computation cost. For example, in an exemplary implementation of the present disclosure, the geomagnetic fingerprint of the position to be measured may further include an air pressure value of the mobile terminal at the position to be measured. Moreover, S402 may include the following sub-blocks:

matching a currently received geomagnetic fingerprint of the position to be measured with each geomagnetic fingerprint in the fingerprint map in response to a difference between an air pressure value in the geomagnetic fingerprint of the position to be measured that is currently received from the mobile terminal and an air pressure value in the geomagnetic fingerprint of the position to be measured that is previously received from the mobile terminal being greater than a first predetermined threshold; and matching the currently received geomagnetic fingerprint of the position to be measured with geomagnetic fingerprint(s) in the fingerprint map that belong(s) to a same height range as geographical position information corresponding to a previously confirmed geomagnetic fingerprint of the position to be measured in response to the difference between the air pressure value in the geomagnetic fingerprint of the position to be measured that is currently received from the mobile terminal and the air pressure value in the geomagnetic fingerprint of the position to be measured that is previously received from the mobile terminal being less than a second predetermined threshold, wherein the first predetermined threshold is greater than or equal to the second predetermined threshold.

In an implementation of the present disclosure, the fingerprint map may be set up in a number of different manners. For example, in an exemplary implementation of the present disclosure, the positioning method may further include the following method blocks prior to S401:

selecting at least two collection points in a region to be positioned in advance;

measuring a magnetic induction value of each predetermined measurement angle at each collection point to form a geomagnetic fingerprint; and storing each formed geomagnetic fingerprint and geographical position information of the collection point corresponding to each geomagnetic fingerprint to obtain the fingerprint map.

Since each geomagnetic fingerprint includes at least two measurement angles and magnetic induction values corresponding thereto, a matching of magnetic induction values of multiple measurement angles at a same position may be performed during positioning and matching, thus increasing an accuracy of matching and positioning of a server. Moreover, an indoor positioning that is based on a geomagnetic field does not need other positioning reference devices, and no special requirements for positioning scenarios are needed, thereby reducing the cost of positioning.

Figure 5:
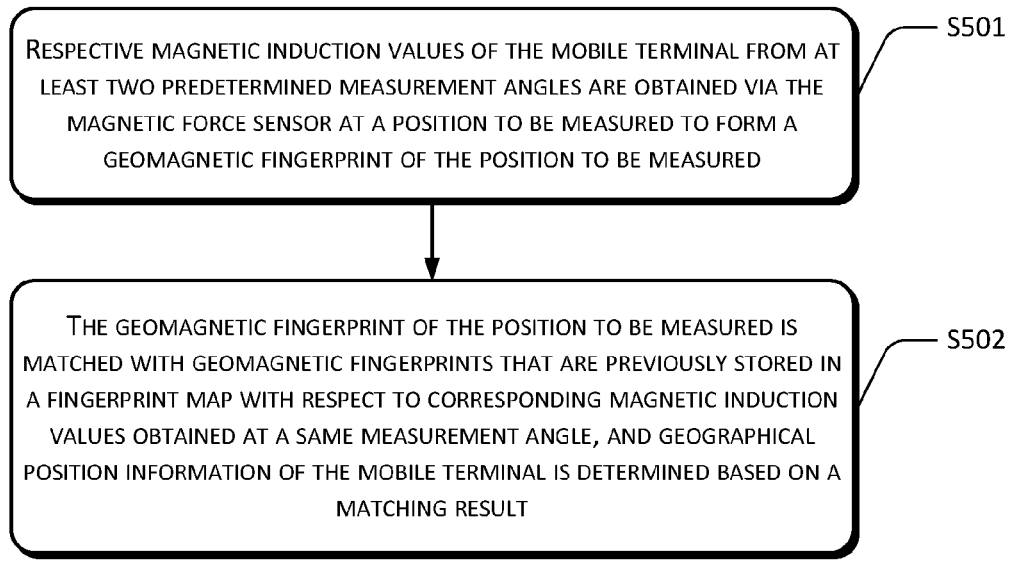
FIG. 5 is a flowchart of a method of positioning a mobile terminal based on geomagnetism according to a third embodiment of the present disclosure.

A third embodiment of the present disclosure is related to a method of positioning a mobile terminal based on geomagnetism. FIG. 5 shows a schematic flowchart of a method of positioning a mobile terminal based on geomagnetism.

In an implementation, the mobile terminal may include at least one magnetic force sensor. As shown in FIG. 5, a method of positioning a mobile terminal based on geomagnetism may include the following method blocks.

At S501, respective magnetic induction values of the mobile terminal from at least two predetermined measurement angles are obtained via the magnetic force sensor at a position to be measured to form a geomagnetic fingerprint of the position to be measured.

At S502, the geomagnetic fingerprint of the position to be measured is matched with geomagnetic fingerprints that are previously stored in a fingerprint map with respect to corresponding magnetic induction values obtained at a same measurement angle. Geographical position information of the mobile terminal is determined based on a matching result, in which each geomagnetic fingerprint includes the at least two predetermined measurement angles and a respective magnetic induction value measured at each predetermined measurement angle, and the fingerprint map includes at least two pieces of geographical position information and a geomagnetic fingerprint corresponding to each piece of geographical position information.

As described in the foregoing description, an air pressure sensor may be adopted to assist in positioning to increase an accuracy of positioning a floor and reduce computation cost for a multi-floor positioning area. Thus, in an exemplary implementation of the present disclosure, the mobile terminal may include an air pressure sensor, and the geomagnetic fingerprint of the position to be measured may further include an air pressure value measured by the air pressure sensor at the position to be measured. Moreover, S502 may include the following sub-blocks:

matching the geomagnetic fingerprint of the position to be measured with each geomagnetic fingerprint in the fingerprint map in an event that a difference between an air pressure value measured by the air pressure sensor at the position to be measured and an air pressure value which is previously measured by the air pressure sensor is greater than a first predetermined threshold; and matching the geomagnetic fingerprint of the position to be measured with geomagnetic fingerprint(s) in the fingerprint map that belong(s) to a same height range as previously confirmed geographical position information of the mobile terminal in an event that the difference between the air pressure value measured by the air pressure sensor at the position to be measured and the air pressure value which is previously measured by the air pressure sensor is less than a second predetermined threshold.

In the present disclosure, S502 may also be implemented in a plurality of different manners. For example, geographical position information of a geomagnetic fingerprint in the fingerprint map which has the highest degree of matching with the geomagnetic fingerprint of the position to be measured may be set as the geographical position information of the position to be measured. Additionally or alternatively, geographical position information of geomagnetic fingerprint(s) which degree(s) of matching with the geomagnetic fingerprint of the position to be measured is/are higher than a certain threshold is/are selected from the fingerprint map. An average position or an average position weighted by the matching degree(s) is computed for the geographical position information corresponding to the geomagnetic fingerprints, and a result thereof is set as the geographical position information of the mobile terminal.

For example, in an exemplary implementation of the present disclosure, a geomagnetic fingerprint having the highest degree of matching with the geomagnetic fingerprint of the position to be measured may be obtained from the fingerprint map by one-by-one matching. Geographical position information corresponding to that geomagnetic fingerprint may be determined as the geographical position information of the mobile terminal. In an implementation, in the geomagnetic fingerprint of the position to be measured, magnetic induction values at different measurement angles form a vector of the geomagnetic fingerprint. For example, for a geomagnetic fingerprint including m measurement angles which are measured at the position to be measured, a geomagnetic fingerprint vector thereof is $\vec{P}=(\vec{V}_1, \vec{V}_2, \vec{V}_3, \ldots \vec{V}_m)$, where $\vec{V}_i$ represents a magnetic induction value measured at an $i^{th}$ ($1 \le i \le m$) measurement angle, and each magnetic induction value corresponds to a three-dimensional coordinate system, which has three components, i.e., $\vec{V}_i=(V_{ix}, V_{iy}, V_{iz})$. A process of matching and positioning may further include S11-S13.

At S11, normalization processing is performed for three components of each magnetic induction value respectively. A normalized magnetic induction value is denoted as $\vec{U}_i$. A geomagnetic fingerprint vector of a position to be measured may be denoted as $\vec{P}=(\vec{U}_1, \vec{U}_2, \vec{U}_3, \ldots \vec{U}_m)$.

For example, an approach of normalization processing for a magnetic induction value may be performed as follows:

$$\begin{cases} \vec{U}_{ix} = \dfrac{V_{ix}}{\sqrt{V_{ix}^2 + V_{iy}^2 + V_{iz}^2}}, \\ \vec{U}_{iy} = \dfrac{V_{iy}}{\sqrt{V_{ix}^2 + V_{iy}^2 + V_{iz}^2}}, \\ \vec{U}_{iz} = \dfrac{V_{iz}}{\sqrt{V_{ix}^2 + V_{iy}^2 + V_{iz}^2}} \end{cases}$$

In other words, relative values of the three components of each magnetic induction value are calculated.

At S12, differences between the geomagnetic fingerprint vector $\vec{P}=(\vec{U}_1, \vec{U}_2, \vec{U}_3, \ldots \vec{U}_m)$ and fingerprint vectors in the fingerprint map are computed and compared accordingly. Specifically, a vector $\vec{P}'$ that meets a condition $|\vec{P}-\vec{P}'| \leq |\vec{P}-\vec{P}''|$ is determined as a geomagnetic fingerprint having the highest degree of matching with the geomagnetic fingerprint measured at the position to be measured, where $\vec{P}'' \in M$, and M is formed by respective vectors corresponding to all geomagnetic fingerprints in the fingerprint map.

At S13, geographical position information of a geomagnetic fingerprint corresponding to the vector $\vec{P}'$ is obtained, and that geographical position information is used as a location of the mobile terminal that is positioned.

In addition, it can be understood that, in an implementation, a database of the fingerprint map may be deployed on a mobile terminal side or a server side.

Since each geomagnetic fingerprint includes at least two measurement angles and magnetic induction values corresponding thereto, a matching of magnetic induction values of multiple measurement angles at a same position may be performed during positioning and matching, thus increasing an accuracy of matching and positioning of a server. Moreover, an indoor positioning that is based on a geomagnetic field does not need other positioning reference devices, and no special requirements for positioning scenarios are needed, thereby reducing the cost of positioning.

The method embodiments of the present disclosure may be implemented using software, hardware, firmware or the like. Regardless of whether the present disclosure is implemented using software, hardware or firmware, instruction codes may be stored in any type of computer-accessible storage devices (such as permanent or modifiable, volatile or non-volatile, solid-state or not solid-state, fixed or replaceable media, etc.). Similarly, the storage devices may include, for example, a Programmable Array Logic (PAL), a Random Access Memory (RAM), a Programmable Read Only Memory (PROM), a Read-Only Memory (ROM), an Electrically Erasable Programmable ROM (EEPROM), a magnetic disc, an optical disc, a Digital Versatile Disc (DVD), etc.

Figure 6:
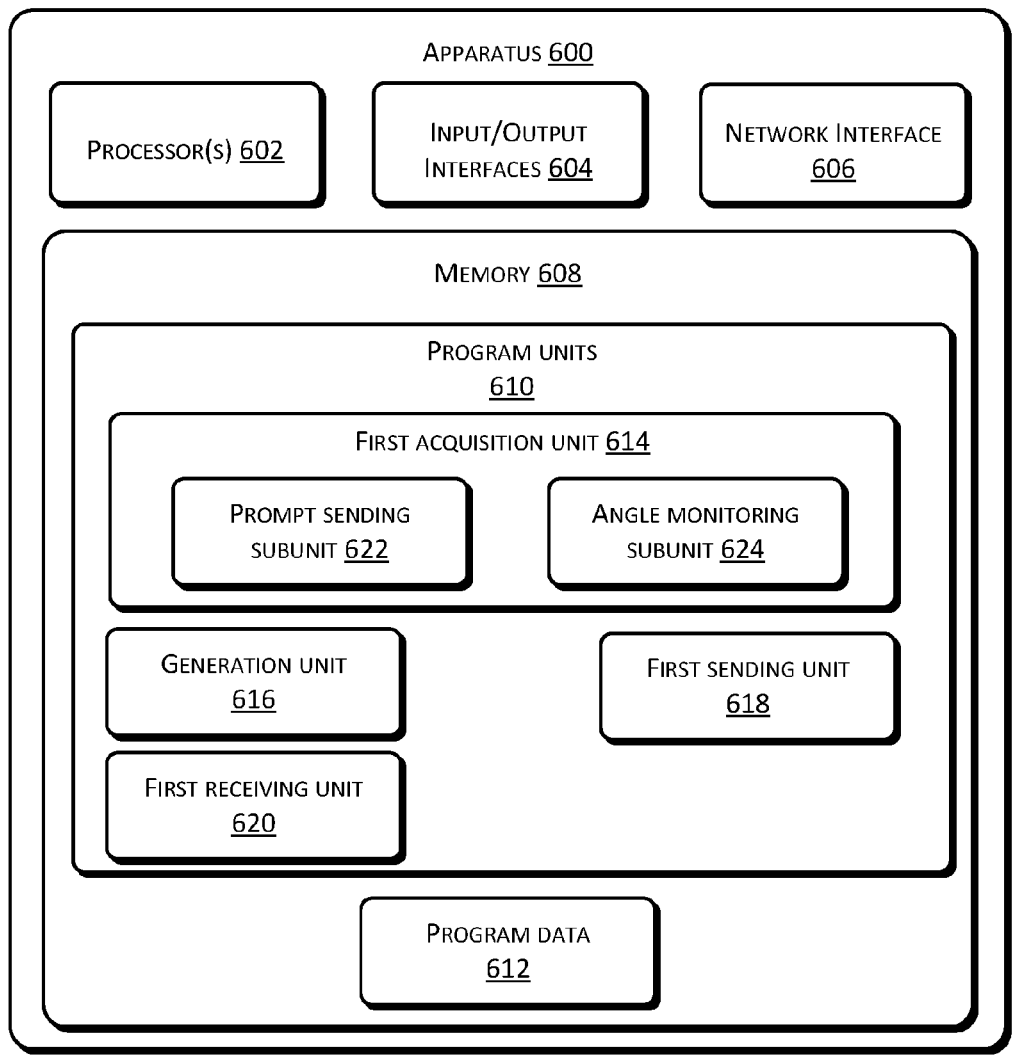
FIG. 6 is a structural diagram of an apparatus of positioning a mobile terminal based on geomagnetism according to a fourth embodiment of the present disclosure.

A fourth embodiment of the present disclosure is related to an apparatus of positioning a mobile terminal based on geomagnetism. FIG. 6 shows a schematic structural diagram of an apparatus 600 of positioning a mobile terminal based on geomagnetism.

In an implementation, the mobile terminal may include at least one magnetic force sensor. The apparatus 600 of positioning the mobile terminal based on geomagnetism may include, but is not limited to, one or more processors 602, an input/output interface 604, a network interface 606, and memory 608.

The memory 608 may include a form of computer-readable media, e.g., a non-permanent storage device, random-access memory (RAM) and/or a nonvolatile internal storage, such as read-only memory (ROM) or flash RAM. The memory 608 is an example of computer-readable media.

The computer-readable media may include a permanent or non-permanent type, a removable or non-removable media, which may achieve storage of information using any method or technology. The information may include a computer-readable command, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

The memory 608 may include program units 610 and program data 612. The program units 610 may include may include a first acquisition unit 614 configured to obtain respective magnetic induction values of the mobile terminal from at least two predetermined measurement angles at a position to be measured via the magnetic force sensor, wherein a measurement angle is referred to as an included angle between a device line of the magnetic force sensor and a direction of gravitational acceleration; a generation unit 616 configured to generate a geomagnetic fingerprint of the position to be measured, the geomagnetic fingerprint including the at least two predetermined measurement angles and the respective magnetic induction values measured at the predetermined measurement angles; a first sending unit 618 configured to send the geomagnetic fingerprint of the position to be measured to a fingerprint map matching system to cause a determination geographical position information corresponding to the geomagnetic fingerprint; and a first receiving unit 620 configured to receive the geographical position information corresponding to the geomagnetic fingerprint returned from the fingerprint map matching system, and determine the received geographical position information as geographical position information of the position to be measured.

Generally, mobile terminals, such as mobile phones and tablet computers, have at least one magnetic force sensor. Therefore, by prompting a user to rotate a mobile terminal in a suitable rotation manner, desirable measurement values for positioning may be obtained to complete the positioning, which is convenient and time-saving. For example, in an exemplary implementation of the present disclosure, the mobile terminal may include a display screen and a magnetic force sensor.

In an implementation, the first acquisition unit 614 may include a prompt sending subunit 622 configured to send a prompt message of rotating the mobile terminal and cause a display of the prompt message on the display screen of the mobile terminal; and an angle monitoring subunit 624 configured to monitor a measurement angle when the mobile terminal is rotated, and obtained the respective magnetic induction values of the at least two predetermined measurement angles measured via the magnetic force sensor.

Furthermore, for a mobile terminal having multiple magnetic force sensors, these multiple magnetic force sensors correspond to different measurement angles. A mobile terminal having multiple magnetic force sensors is able to obtain magnetic induction values at multiple measurement angles during positioning at a certain time point or at a same position simultaneously, and does not like a mobile terminal with only one magnetic force sensor that needs to perform measurements from multiple measurement angles, thus further increasing the efficiency of obtaining magnetic induction data and making positioning simple and convenient. For example, in another exemplary implementation of the present disclosure, the mobile terminal may possess at least two magnetic force sensors, and device lines of different magnetic force sensors have different included angles with the direction of gravitational acceleration at a same time point.

For a multi-floor positioning area, an air pressure sensor may be adopted to assist in positioning, which can increase the accuracy of positioning the floors and need a less computation amount. For example, in an exemplary implementation of the present disclosure, the mobile terminal may include an air pressure sensor. The first acquisition unit 614 measures an air pressure value of the mobile terminal at the position to be measured via the air pressure sensor, and the geomagnetic fingerprint further includes the measured air pressure value.

The first embodiment is a method implementation corresponding to the present embodiment, and the present embodiment can be cooperatively implemented in combination with the first embodiment. Related technical details described in the first embodiment are still effective in the present embodiment, and are not repeatedly described herein to reduce redundancy. Correspondingly, related technical details described in the present embodiment is also applicable to the first embodiment.

Figure 7:
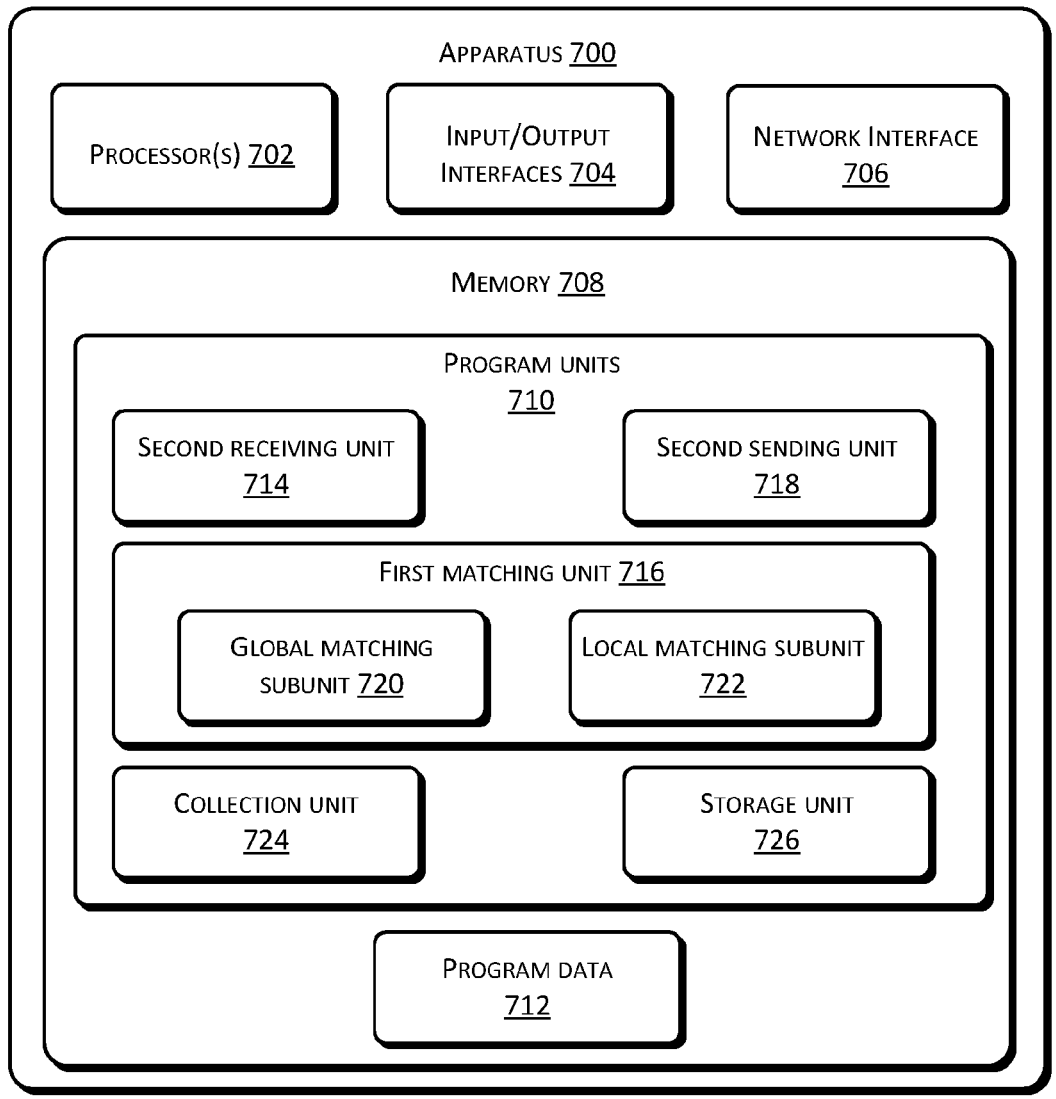
FIG. 7 is a structural diagram of an apparatus of positioning a mobile terminal based on geomagnetism according to a fifth embodiment of the present disclosure.

A fifth embodiment of the present disclosure is related to an apparatus of positioning a mobile terminal based on geomagnetism. FIG. 7 shows a schematic structural diagram of an apparatus 700 of positioning a mobile terminal based on geomagnetism.

As shown in FIG. 7, in an implementation, the apparatus 700 of positioning a mobile terminal based on geomagnetism may include, but is not limited to, one or more processors 702, an input/output interface 704, a network interface 706, and memory 708. The memory 708 may include a form of computer-readable media, e.g., a non-permanent storage device, random-access memory (RAM) and/or a nonvolatile internal storage, such as read-only memory (ROM) or flash RAM. The memory 708 is an example of computer-readable media as described in the foregoing description.

The memory 708 may include program units 710 and program data 712. The program units 710 may include may include a second receiving unit 714 configured to receive a geomagnetic fingerprint of a position to be measured from a mobile terminal, the geomagnetic fingerprint including at least two predetermined measurement angles and corresponding magnetic induction values measured at the predetermined measurement angles via a magnetic force sensor of the mobile terminal; a first matching unit 716 configured to perform a matching between the received geomagnetic fingerprint and geomagnetic fingerprints previously stored in a fingerprint map via respective magnetic induction values obtained from a same measurement angle, and determine geographical position information corresponding to the geomagnetic fingerprint of the position to be measured based on a matching result; and a second sending unit 718 configured to return the geographical position information corresponding to the geomagnetic fingerprint of the position to be measured to the mobile terminal.

For a multi-floor positioning area, an air pressure sensor may be employed to assist in positioning, which is able to increase an accuracy of positioning a floor and requires less computation cost. For example, in an exemplary implementation of the present disclosure, the geomagnetic fingerprint of the position to be measured may further include an air pressure value of the mobile terminal at the position to be measured. In an implementation, the first matching unit 716 may include a global matching subunit 720 and a local matching subunit 722.

In an implementation, the global matching subunit 720 matches a currently received geomagnetic fingerprint of the position to be measured with each geomagnetic fingerprint in the fingerprint map in response to a difference between an air pressure value in the geomagnetic fingerprint of the position to be measured that is currently received from the mobile terminal and an air pressure value in the geomagnetic fingerprint of the position to be measured that is previously received from the mobile terminal being greater than a first predetermined threshold.

In an implementation, the local matching subunit 722 matches the currently received geomagnetic fingerprint of the position to be measured with geomagnetic fingerprint(s) in the fingerprint map that belong(s) to a same height range as geographical position information corresponding to a previously confirmed geomagnetic fingerprint of the position to be measured in response to the difference between the air pressure value in the geomagnetic fingerprint of the position to be measured that is currently received from the mobile terminal and the air pressure value in the geomagnetic fingerprint of the position to be measured that is previously received from the mobile terminal being less than a second predetermined threshold. In an implementation, the first predetermined threshold is greater than or equal to the second predetermined threshold.

In an implementation of the present disclosure, the fingerprint map may be set up in a number of different manners. For example, in an exemplary implementation of the present disclosure, the positioning apparatus 700 may further include a collection unit 724 configured to select at least two collection points in a region to be positioned in advance, and measure a magnetic induction value of each predetermined measurement angle at each collection point to form a geomagnetic fingerprint; and a storage unit 726 configured to store each formed geomagnetic fingerprint and geographical position information of the collection point corresponding to each geomagnetic fingerprint to obtain the fingerprint map.

The second embodiment is a method implementation corresponding to the present embodiment, and the present embodiment can be cooperatively implemented in combination with the second embodiment. Related technical details described in the second embodiment are still effective in the present embodiment, and thus are not repeatedly described herein to reduce redundancy. Correspondingly, related technical details described in the present embodiment is also applicable to the second embodiment.

Figure 8:
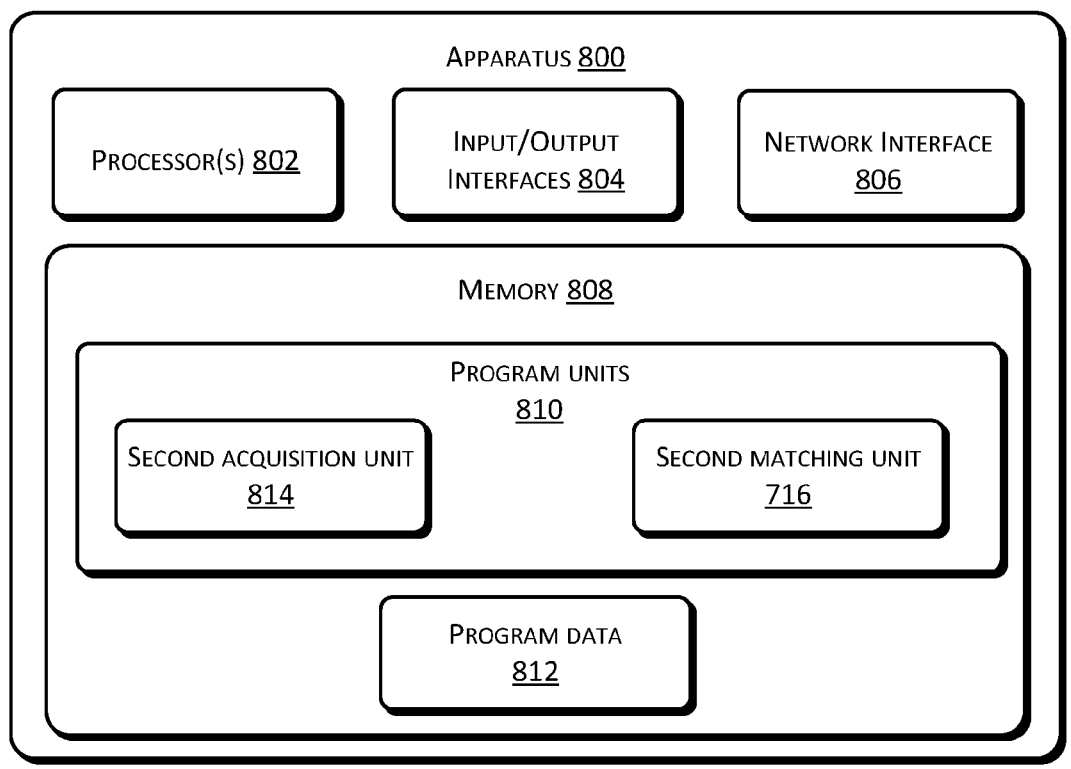
FIG. 8 is a structural diagram of an apparatus of positioning a mobile terminal based on geomagnetism according to a sixth embodiment of the present disclosure.

A sixth embodiment of the present disclosure is related to an apparatus of positioning a mobile terminal based on geomagnetism. FIG. 8 shows a schematic structural diagram of an apparatus 800 of positioning a mobile terminal based on geomagnetism.

In an implementation, the mobile terminal may include at least one magnetic force sensor. In an implementation, the apparatus 800 may include, but is not limited to, one or more processors 802, an input/output interface 804, a network interface 806, and memory 808. The memory 808 may include a form of computer-readable media, e.g., a non-permanent storage device, random-access memory (RAM) and/or a nonvolatile internal storage, such as read-only memory (ROM) or flash RAM. The memory 808 is an example of computer-readable media as described in the foregoing description.

The memory 808 may include program units 810 and program data 812. The program units 810 may include may include a second acquisition unit 814 and a second matching unit 816.

The second acquisition unit 814 obtains corresponding magnetic induction values of the mobile terminal at a position to be measured from at least two predetermined measurement angles using the magnetic force sensor, to obtain a geomagnetic fingerprint of the position to be measured.

The second matching unit 816 performs a matching between the received geomagnetic fingerprint and geomagnetic fingerprints previously stored in a fingerprint map via respective magnetic induction values obtained from a same measurement angle, and determines geographical position information corresponding to the geomagnetic fingerprint of the position to be measured in accordance with a matching result, wherein each geomagnetic fingerprint of the geomagnetic fingerprints includes the at least two predetermined measurement angles and a magnetic induction value measured at each predetermined measurement angle, and the fingerprint map includes at least two pieces of geographical position information and a geomagnetic fingerprint corresponding to each piece of geographical position information.

The third embodiment is a method implementation corresponding to the present embodiment, and the present embodiment can be cooperatively implemented in combination with the third embodiment. Related technical details described in the third embodiment are still effective in the present embodiment, and thus are not repeatedly described herein to reduce redundancy. Correspondingly, related technical details described in the present embodiment is also applicable to the third embodiment.

It should be noted that various units described in the apparatus implementations of the present disclosure are logical units. Physically, a logical unit may be a physical unit, or a component of a physical unit, and may be implemented with a combination of a plurality of physical units. Physical implementations of these logical units per se are not the most important, but a combination of functions implemented by these logical units is a key to solving the technical problems that are set forth in the present disclosure. In addition, in order to highlight the innovative parts of the present disclosure, the apparatus implementations of the present disclosure do not introduce unit(s) that is/are not closely associated with the technical problems set forth in the present disclosure, which however does not indicate that the apparatus implementations do not have other units.

It should be noted that relational terms described herein, such as "first" and "second", etc., are used solely to distinguish one entity or operation from another entity or operation without necessarily requiring or implying any existence of such relationship or ordering between these entities or operations in reality. Moreover, terms such as "comprise", "include" and any other variants thereof are intended to cover a non-exclusive inclusion. A process, method, product or device that includes a series of elements not only includes those elements, but also includes other elements that are not explicitly listed, or further includes elements that already existed in such process, method, product or device. In a condition without further limitations, an element defined by a phrase "include a/an . . . " does not exclude any other similar elements from existing in the process, method, product or device.

Although the present disclosure has been illustrated and described using certain exemplary embodiments of the present disclosure, one of ordinary skill in the art should understand that various changes may be made to the forms and details of these embodiments without departing from the spirit and scope of the present disclosure.

What is claimed is:

1. A method implemented by one or more computing devices, the method comprising:
    obtaining respective magnetic induction values of a mobile terminal at a plurality of measurement angles at a position to be measured;
    generating a geomagnetic fingerprint of the position to be measured, the geomagnetic fingerprint comprising the plurality of measurement angles and respective magnetic induction values measured at the plurality of measurement angles;
    sending the geomagnetic fingerprint of the position to be measured to a fingerprint map matching system to cause a determination of geographical position information corresponding to the geomagnetic fingerprint; and
    receiving the geographical position information corresponding to the geomagnetic fingerprint from the fingerprint map matching system, the received geographical position information being set as geographical position information of the position to be measured,
    wherein:
    the geomagnetic fingerprint of the position to be measured further comprises an air pressure value of the mobile terminal at the position to be measure; and
    the determination of geographical position information comprises matching the received geomagnetic fingerprint of the position to be measured with one or more geomagnetic fingerprints in a fingerprint map belonging to a height range that is same as geographical position information corresponding to a previously confirmed geomagnetic fingerprint of the mobile terminal in response to a difference between the air pressure value in the received geomagnetic fingerprint and an air pressure value in a previous geomagnetic fingerprint being less than a predetermined threshold.

2. The method of claim 1, wherein a measurement angle of the plurality of measurement angles comprises an included angle between a device line of a magnetic force sensor of the mobile terminal and a direction of gravitational acceleration.

3. The method of claim 1, wherein the mobile terminal comprises a plurality of magnetic force sensors, and each measurement angle of the plurality of measurement angles comprises an included angle between a device line of a respective magnetic force sensor of the plurality of magnetic force sensors and a direction of gravitational acceleration.

4. The method of claim 3, wherein the plurality of measurement angles are measured via the plurality of magnetic force sensors of the mobile terminal at a same time point.

5. The method of claim 1, wherein obtaining the respective magnetic induction values of the mobile terminal comprises:
   sending a prompt to a user of the mobile terminal to rotate the mobile terminal to each of the plurality of measurement angles;
   monitoring the plurality of measurement angles during a rotation of the mobile terminal; and
   obtaining the respective magnetic induction values measured by a magnetic force sensor of the mobile terminal at the plurality of measurement angles.

6. The method of claim 5, wherein the prompt comprises one or more of a display message or a voice prompt.

7. The method of claim 1, wherein the air pressure value is measured by an air pressure sensor of the mobile terminal.

8. One or more computer-readable media storing executable instructions that, when executed by one or more processors, cause the one or more processors to perform acts comprising:
   receiving a geomagnetic fingerprint of a position to be measured from a mobile terminal, the geomagnetic fingerprint comprising a plurality of measurement angles and respective magnetic induction values measured at the plurality of measurement angles;
   performing a matching between the received geomagnetic fingerprint and geomagnetic fingerprints in a fingerprint map;
   determining geographical position information corresponding to the geomagnetic fingerprint of the position to be measured in accordance with a result of the matching; and
   returning the geographical position information corresponding to the geomagnetic fingerprint of the position to be measured to the mobile terminal,
   wherein
   the geomagnetic fingerprint of the position to be measured further comprises an air pressure value of the mobile terminal at the position to be measure; and
   performing the matching comprises matching the received geomagnetic fingerprint of the position to be measured with one or more geomagnetic fingerprints in the fingerprint map belonging to a height range that is same as geographical position information corresponding to a previously confirmed geomagnetic fingerprint of the mobile terminal in response to a difference between the air pressure value in the received geomagnetic fingerprint and an air pressure value in a previous geomagnetic fingerprint being less than a predetermined threshold.

9. The one or more computer-readable media of claim 8, wherein performing the matching further comprises comparing a magnetic induction value of the received fingerprint to respective magnetic induction values of the geomagnetic fingerprints obtained at a measurement angle that is the same as the magnetic induction value of the received fingerprint.

10. The one or more computer-readable media of claim 8, wherein the respective magnetic induction values are measured by one or more magnetic force sensors of the mobile terminal at the plurality of measurement angles.

11. The one or more computer-readable media of claim 8, wherein performing the matching further comprises matching the received geomagnetic fingerprint of the position to be measured with each geomagnetic fingerprint in the fingerprint map in response to a difference between the air pressure value in the received geomagnetic fingerprint of the position to be measured and the air pressure value in the previous geomagnetic fingerprint of the mobile terminal being greater than the predetermined threshold.

12. The one or more computer-readable media of claim 8, the acts further comprising:
   determining whether the difference between the air pressure value in the received geomagnetic fingerprint and the air pressure value in the previous geomagnetic fingerprint is greater than a first threshold or less than a second threshold, the second threshold being less than the first threshold;
   matching the received geomagnetic fingerprint of the position to be measured with each geomagnetic fingerprint in the fingerprint map in response to the difference between the air pressure value in the received geomagnetic fingerprint of the position to be measured and the air pressure value in the previous geomagnetic fingerprint of the mobile terminal being greater than the first threshold; and
   matching the received geomagnetic fingerprint of the position to be measured with one or more geomagnetic fingerprints in the fingerprint map belonging to the height range that is same as geographical position information corresponding to the previously confirmed geomagnetic fingerprint of the mobile terminal in response to the difference between the air pressure value in the received geomagnetic fingerprint and the air pressure value in the previous geomagnetic fingerprint being less than the second threshold.

13. The one or more computer-readable media of claim 8, wherein prior to perform the matching, the acts further comprise:
   selecting a plurality of collection points in a region to be positioned in advance;
   measuring a magnetic induction value of each measurement angle of the plurality of measurement angles at each collection point of the plurality of collection points to form a corresponding geomagnetic fingerprint; and
   storing each formed geomagnetic fingerprint and geographical position information of the respective collection point corresponding to each formed geomagnetic fingerprint to obtain the fingerprint map.

14. An apparatus comprising:
   one or more processors;
   memory;
   a second acquisition unit stored in the memory and executable by the one or more processors to obtain respective magnetic induction values of a mobile terminal at a position to be measured at a plurality of predetermined measurement angles, to obtain a geomagnetic fingerprint of the position to be measured; and
   a second matching unit stored in the memory and executable by the one or more processors to perform a matching between the received geomagnetic fingerprint and one or more geomagnetic fingerprints previously stored in a fingerprint map, and determine geographical position information corresponding to the geomagnetic fingerprint of the position to be measured based at least in part on a result of the matching,
   wherein:
   the geomagnetic fingerprint of the position to be measured further comprises an air pressure value of the mobile terminal at the position to be measure; and performing the matching comprises matching the received geomagnetic fingerprint of the position to be measured with one or more geomagnetic fingerprints in the fingerprint map belonging to a height range that is same as geographical position information corresponding to a previously confirmed geomagnetic fingerprint of the mobile terminal in response to a difference between the air pressure value in the received geomagnetic fingerprint and an air pressure value in a previous geomagnetic fingerprint being less than a predetermined threshold.

15. The apparatus of claim 14, wherein the apparatus comprises the mobile terminal.

16. The apparatus of claim 15, wherein the mobile terminal comprises one or more magnetic force sensors that measure the respective magnetic induction values at the plurality of predetermined measurement angles.

17. The apparatus of claim 14, wherein the second matching unit performs the matching by comparing a magnetic induction value of the obtained fingerprint to respective one or more magnetic induction values of the one or more geomagnetic fingerprints obtained at a measurement angle that is the same as the magnetic induction value of the received fingerprint.

18. The apparatus of claim 14, wherein the fingerprint map comprises at least two pieces of geographical position information and a geomagnetic fingerprint corresponding to each of the at least two pieces of geographical position information.

* * * * *